Patented Jan. 31, 1950

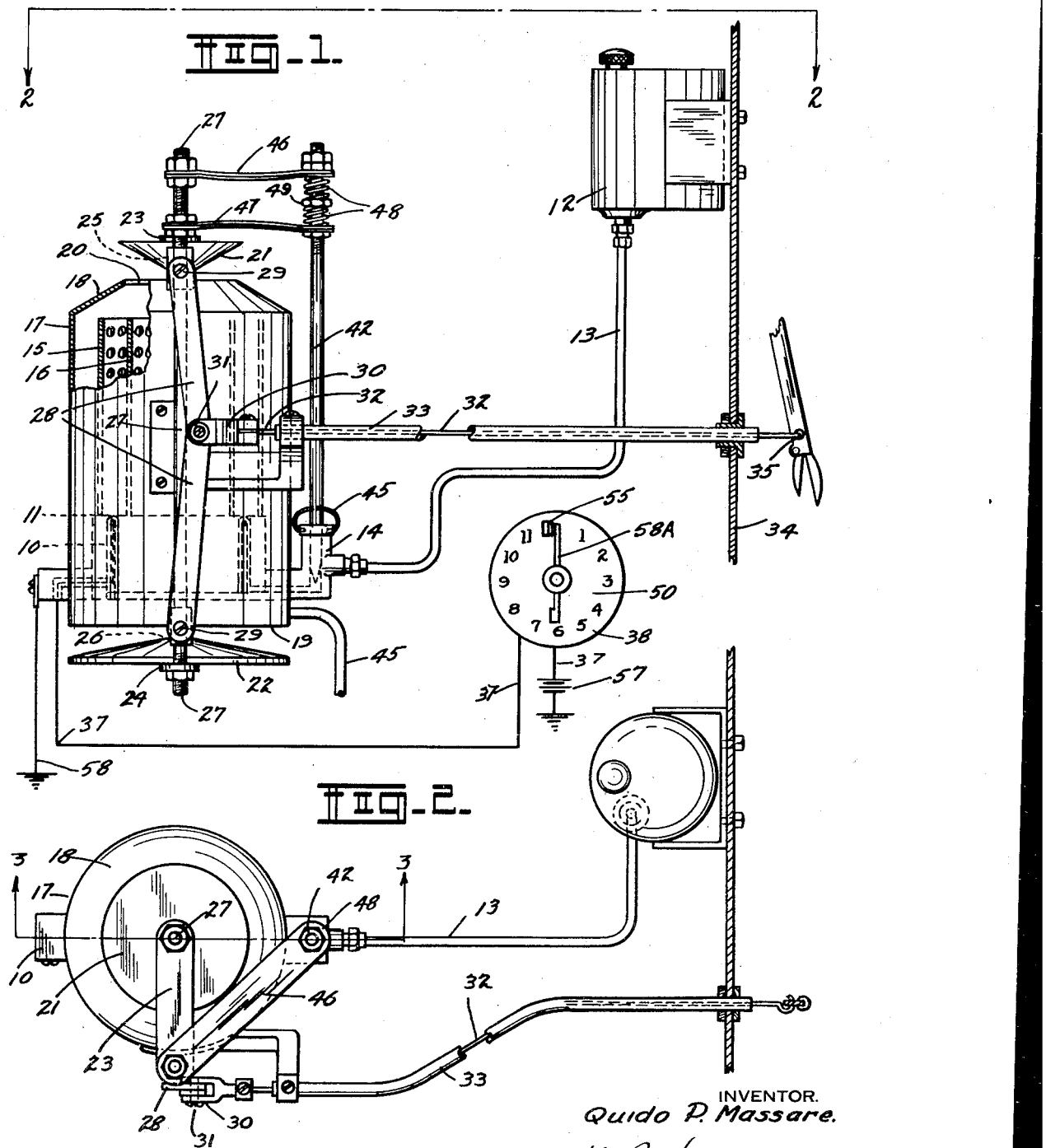

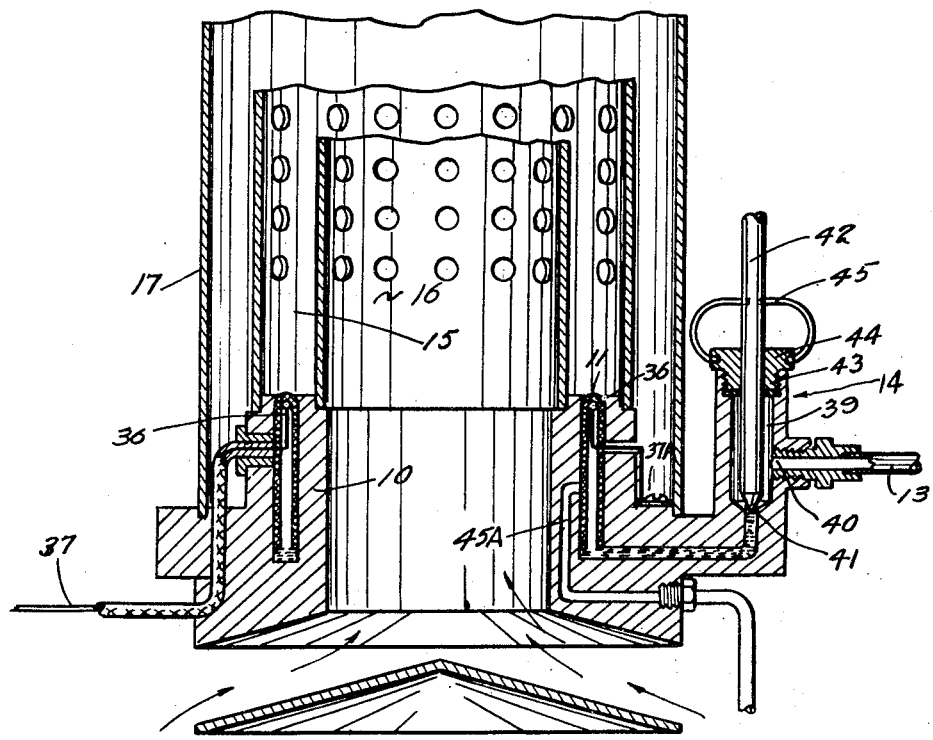
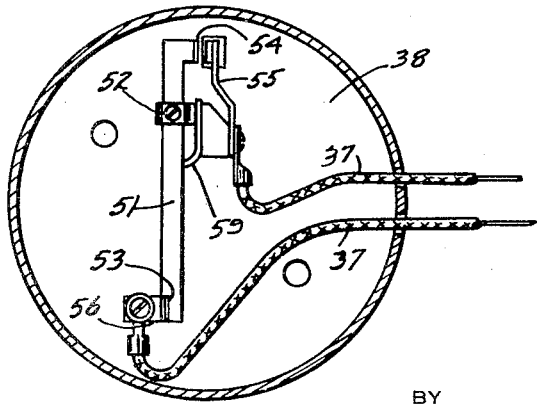

2,495,857

UNITED STATES PATENT OFFICE 2,495,857

LIQUID FUEL BURNING HEATER AND DAMPER CONTROL

Quido P. Massare, Windham, Ohio

Application April 16, 1947, Serial No. 741,799

3 Claims. (Cl. 158—42.4)

1

This invention relates to a heating device and more particularly to a heating device adapted for warming an automobile engine or the like.

The principal object of the invention is to provide a heating device for automobile engines and the like.

A further object of the invention is to provide a small inexpensive heating device which may be placed under the hood of an automobile or truck, for example, adjacent the engine thereof and which may be used to suitably heat the engine.

A still further object of the invention is to provide a heating device adapted to use a common, readily procured fuel.

A still further object of the invention is to provide a heating device incorporating automatic control means therefor.

A still further object of the invention is the provision of a heating device having an automatic ignition system therein capable of remote actuation.

A still further object of the invention is to provide a heating device having extinguishing means incorporated therewith.

The heating device shown and described herein has been designed primarily for use in connection with automobile engines and is, therefore, intended for installation in the engine compartment of an automobile or truck, under the hood thereof, so that the heat produced by the heating device will maintain the engine at a suitable temperature and thereby avoid damage thereto as from freezing or congealing of the lubricating oils therein. The device is capable of remote actuation as from the driver's compartment of an automobile or a truck and includes thermostat means for automatically controlling the degree of heat produced by the heating device.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side elevation of the heating device with parts broken away and parts in cross section.

Figure 2 is a top plan view of the heating device.

Figure 3 is an enlarged vertical cross section

2 of the heating device taken on line 3—3 of Figure 2 and showing the detail of the burner and valve portions thereof.

Figure 4 is an enlarged detailed elevation of a portion of the mechanism shown in Figure 1.

By referring to the drawings and Figures 1, 2 and 3 in particular, it will be seen that the heating device comprises a burner 10 having an annular wick 11 positioned therein, a fuel supply tank 12 and a tubular connection 13 between the fuel supply tank 12 and the burner 10 and controlled by a valve 14. A pair of perforated burner cylinders 15 and 16 are positioned on the upper annular surface of the burner and are spaced apart sufficiently to permit the flame from the wick 11 to rise vertically therebetween. A cylindrical casing 17 having an inwardly tapering flange 18 on its uppermost end is positioned about the burner assembly with the exception of the valve 14. The cylindrical casing 17 is open at its bottom end 19 and the flange 18 defines an opening 20 at its uppermost end. In order that the openings 19 and 20 may be closed so as to extinguish a fire in the burner 10, dampers 21 and 22 which are cone-shaped and mounted in oppositely disposed relation are provided and are arranged for selective registry with the openings 20 and 19, respectively. It will be observed by referring to Figure 1 in particular that the cone-shaped damper 21 is of smaller diameter than the damper 22 but is of sufficient size to adequately close the opening 20 in the upper end of the cylindrical housing 17 of the heating device. The dampers 21 and 22 are supported in operative relationship to the openings 19 and 20 by means of horizontally extending arms 23 and 24, respectively, which are attached to the dampers and are mounted at their opposite ends, where they extend to one side of the cylindrical housing 17, to brackets 25 and 26 which in turn are slidably mounted on a vertically positioned guide rod 27. Thus when the brackets 25 and 26 are moved toward one another along the guide rod 27 the dampers 21 and 22 are moved toward each other thereby and into registry with the openings 19 and 20 of the cylindrical housing.

Means for imparting such movement to the brackets 25 and 26 is provided and comprises a pair of arms 28, each of which is pivoted at its outermost end and as by means of pivots 29 to brackets 25 and 26, respectively, and each of which are pivoted at their innermost ends to one another and to a bifurcated bracket 30 by means of a pivot 31. It will thus be seen that when the bifurcated bracket 30 is moved on a horizontal plane the result of the movement will be to impart vertical movement to the brackets 25 and 26 and hence to the dampers 21 and 22 thereby bringing the dampers into simultaneous registry with the openings 19 and 20 or moving them away therefrom.

Means for moving the bifurcated brackets 30 is provided and comprises a flexible wire 32 which is run in a protective tubular conduit 33 to a remote location such as, for example, through a bulkhead 34 of an automobile and connected with a suitable lever such as shown and indicated by the numeral 35.

Means for igniting the wick 11 is provided and comprises an electrical resistance element 36 which is positioned in operative relation to the wick 11 and electrically connected to a suitable power source as by means of a wire 37, one end of the resistance element 36 being grounded to the burner structure as by a grounding screw 37A.

As best illustrated in Figures 1 and 4 of the drawings, means is provided for establishing an electrical circuit through the resistance element 36 by way of the wire 37 and is preferably incorporated in a clock means so that the heating device may be brought into operation at any predetermined time as, for example, an hour or two before the automobile or other vehicle in which the heating device is installed is to be used. The clock-like mechanism for this purpose is illustrated in Figures 1 and 4 of the drawings and is indicated generally by the numeral 38 and an explanation of the operation of the same will be incorporated herein.

The fuel supply valve 14 is illustrated in enlarged detail in Figure 3 of the drawing and comprises a chamber 39 having an inlet orifice 40 and an outlet orifice 41, the latter being subject to control by a pointed valve rod 42 which is reciprocally mounted in the chamber 39 and extends upwardly through a gland 43 and a cap 44. A coil spring 45 normally biases the valve rod 42 downwardly so as to close the outlet 41 from the valve chamber 39. Fuel entering the valve chamber 40 as from the tubular connection 13 is thereby controlled by the valve prior to entering the annular burner in which the wick 11 is positioned.

Still referring to Figure 3 of the drawings it will be seen that an overflow 45A is provided so that excess fuel will be diverted from the burner in the event of mechanical failure of the control valve or its operating means.

By referring again to Figures 1 and 2 of the drawings it will be seen that the control valve 14 and more particularly the valve rod 42 thereof is subject to control by a pair of bimetallic thermostatic strips 46 and 47, each of which are connected to the guide rod 27 at one of their ends and each of which are connected to the valve rod 42 at their opposite ends. The connections to the valve rod 42 are spaced by means of coil springs 48 so that the action of the bimetallic thermostatic strips 46 and 47 may be adjusted. The bimetallic thermostatic strip 46 is positioned so that the end thereof connecting with the valve rod 42 moves downwardly when the bimetallic thermostatic strip 46 is heated and thereby tends to close the fuel valve 14. This action is partially offset by the bimetallic thermostatic strip 47 which tends to move upwardly when heated thereby affording a means of control for the motion of the bimetallic strip 46 and comprising the springs 48 separated by an adjustment nut 49 threadably engaging the valve rod 42.

The bimetallic strips 46 and 47 are so arranged and adjusted that when the heating device is inoperative and, therefore, cold, the combined action of the bimetallic strip 47 and the spring 45 will hold the valve rod 42 in registry with the outlet 41 and thereby shut off the flow of fuel to the burner. Some fuel remains at all times in the annular burner passageway in which the wick 11 is disposed by reason of the extinguishing action of the dampers 21 and 22, heretofore referred to. When the control handle 35 is moved to open the dampers 21 and 22 and the resistance element 36 energized, this fuel is sufficient to heat the bimetallic thermostat 47 sufficiently to overcome the action of the bimetallic thermostat 46 and the spring 45 and thus open the fuel valve 14 to insure a further supply of fuel.

The degree of opening is determined by the adjustment of the nut 49 on the valve rod 42. As long as the burner operates, the heating of the bimetallic thermostat 47 results in sufficient energy being obtained therefrom to hold the valve rod 42 in open position. When the heating device is shut off, as by the action of the dampers 21 and 22, the cooling of the bimetallic thermostat 47 will allow the spring 45 to again close the fuel valve 14.

It will thus be seen that the heating device is so designed that it effectively controls its own fuel supply by reason of heat generated.

The clock means 38 heretofore referred to as forming a preferred means of controlling the resistance element circuit 36 includes a conventional clock works either electrically or spring actuated and a single hand corresponding to the hour hand and capable of being manually turned back upon a dial 50 in a desired degree up to twelve hours. On the back of the clock works, as shown in Figure 4 of the drawings, a double acting switch mechanism is provided and includes a pivot arm 51 pivoted to the clock works mechanism at 52 and having contacts 53 and 54 on its opposite ends. A contact 55 is spaced adjacent the contact 54 and a contact 56 is spaced adjacent the contact 53. The circuit wire 37 is attached to the contact 56 and to a power source such as a storage battery 57. As the burner 10 is grounded by means of a wire 58, a circuit is thus completed through the resistance element 36 upon the closing of the contacts 53 and 54. An extension of the contact 55 is passed through the housing of the clock works 38 and extends from the front thereof over the dial 50 so as to be engageable by the hand 58A. Thus, when the hand 58A, which travels counter-clockwise, reaches the projection of the contact 55, it engages the same and moves it into engagement with the contact 54. The contact 54 is connected with the contact 53 which is held in registry with the contact 56 by a spring 59, thus completing a circuit through the device.

As the clock works continues to move the hand 58A and the contact 55, the arm 51 is pivoted on the pivot 52 thereby moving the contact 53 out of engagement with the contact 56. The electrical circuit to the resistance element 36 thereby remains completed only a few seconds sufficient to ignite the burner and is then immediately disconnected.

It will be obvious to those skilled in the art that other types of control switches may be employed, but that heretofore described herein is preferred as it enables the heating device to be installed for example in an automobile and the hand 58A of the clock control to be preset to a number of hours at which time the heating device will be placed in operation.

It will be obvious that it would be necessary to manually open the dampers 21 and 22 so that the heating device will be able to operate when the predetermined time is reached. The dampers are intended for use only in extinguishing the heating device and are therefore normally open.

It will thus be seen that a heating device particularly adapted for installation in motor vehicles for engine warming purposes has been disclosed which may be economically formed of a relatively few parts and which will operate efficiently and thereby perform its intended purpose.

Having thus described my invention, what I claim is:

1. A heating device including a circular liquid fuel burner, a cylindrical housing positioned thereon and extending thereabove and having an outlet orifice at its uppermost end, an inlet orfice in the said burner and dampers movably disposed adjacent the said heating device for registry with the said orifices, means for controlling the said dampers for moving them into registry with the said orifices so that the fire in the heating device may be extinguished thereby, said means including a vertically positioned guide rod positioned axially of the said burner and housing and extending thereabove and therebelow, guide rod brackets slidably disposed on the said guide rod and connected to the said dampers and a pair of arms pivoted at their outermost ends to the said guide rod brackets and to one another at their innermost ends, and a manually operated lever connected to the said arms at their point of pivotal connection for imparting movement thereto to move said dampers.

2. A heating device including a circular liquid fuel burner, a cylindrical housing positioned thereon and extending thereabove and having an outlet orifice at its uppermost end, an inlet orifice in the said burner and dampers movably disposed adjacent the said heating device for registry with the said orifices, means for controlling the said dampers for moving them into registry with the said orifices so that the fire in the heating device may be extinguished thereby, said means including a vertically positioned guide rod positioned axially of the said burner and housing and extending thereabove and therebelow, guide rod brackets slidably disposed on the said guide rod and connected to the said dampers and a pair of arms pivoted at their outermost ends to the said guide rod brackets and to one another at their innermost ends, and a manually operated lever connected to the said arms at their point of pivotal connection for imparting movement thereto to move said dampers, a fuel valve and a supply for said burner, and means responsive to heat generated by said heating device for opening said fuel valve.

3. The combination of a heating device including a liquid fuel burner formed in a circular pattern and having an opening centrally thereof, a housing disposed on the said burner and defining in connection therewith a closed vertical passageway in which the liquid fuel is burned, the said liquid fuel burner having a deep annular fuel reservoir, the housing having an opening in the upper end thereof, dampers disposed below and above the said burner and housing, respectively, and means for moving the said dampers toward each other into the said openings so as to close the said vertical passageway to extinguish a fire in the burner and a fuel supply for said burner in communication therewith and automatic heat responsive means for opening the said fuel supply subject to heat generated by the said heating device and for shutting off the said fuel supply after the said fire is extinguished so as to permit sufficient fuel to pass into the said circular reservoir of the burner to enable the same to be relit.

QUIDO P. MASSARE.

REFERENCES CITED

The following references are of record in the file of this patent:

UNITED STATES PATENTS

| Number | Name | Date |
|---|---|---|
| Re. 15,000 | Stafford | Dec. 7, 1920 |
| 1,654,175 | Kitzeman | Dec. 27, 1927 |
| 1,887,514 | Piatt | Nov. 15, 1932 |
| 2,287,346 | Fishel | June 23, 1942 |